Jan. 24, 1956  H. GUNKEL  2,732,179
CHAIN PULLEY BLOCK
Filed Aug. 13, 1951
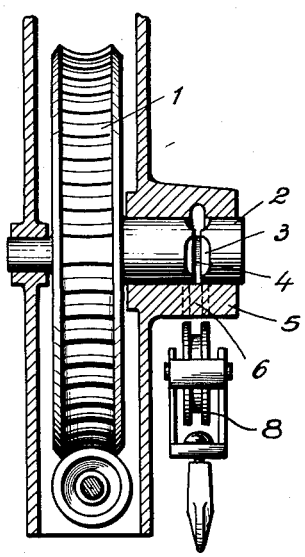
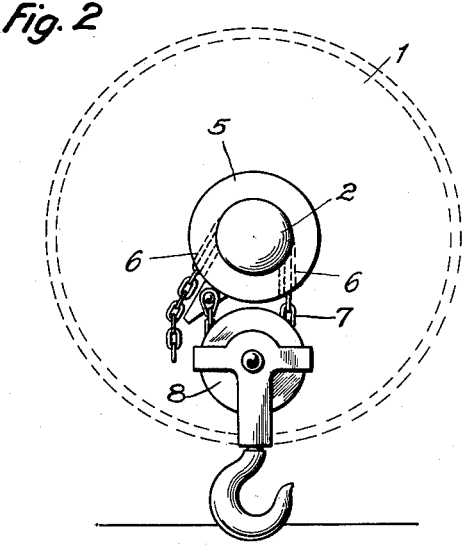
INVENTOR
HEINRICH GUNKEL
BY Emery Holcombe & Blau
ATTORNEYS United States Patent Office 2,732,179
Patented Jan. 24, 1956

2,732,179

CHAIN PULLEY BLOCK

Heinrich Gunkel, Dusseldorf, Germany

Application August 13, 1951, Serial No. 241,625

Claims priority, application Germany August 28, 1950

2 Claims. (Cl. 254—170)

This invention relates to chain pulley blocks and has for its object the provision of a chain pulley block which requires the smallest possible amount of material for its construction, without the strength of the pulley block suffering thereby.

In some known chain pulley blocks, the chain wheel or hub combined with the driving toothed wheel is mounted on a stationary pin which passes through the hub. It is also known to provide on the driving toothed wheel an extension which forms the chain hub and which has a cylindrical pin which acts as a bearing pin, and the driving toothed wheel together with the chain hub lie within the casing.

The requirement of economical consumption of material demands the smallest possible load moment in pulley blocks, or the smallest possible number of teeth for the chain wheel. For this reason, chain wheels having five teeth and also having four teeth have been used. Above all, in four-toothed chain wheels, if the mounting of the wheel is carried out by means of a pin passing therethrough, a relatively small cross-section of material remains after the wheel has been bored because of the narrow groove which is required to receive the alternate chain links. In those chain wheels which are mounted in lateral shoulders, the cross-section at the grooved portion is, it is true, larger, on account of the absence of any bore, but the cross-section is unfavorably stressed on bending.

A further object of the invention is to provide a chain pulley block in which the chain wheel comprises a cylindrical pin provided with chain pockets and which is combined with the driving wheel to form a journal therefor, the pin being enclosed by a bearing having two bottom openings as a passage for the chain. This offers the advantage that, owing to the enclosure of the chain wheel and journal by the bearing on both sides as far as the joint at the grooved portion, the stresses in the reduced cross-section are substantially diminished, with the result that the cross-section can be reduced and even chain wheels having only three teeth can be used.

The advantage achieved by the invention thus not only consists in a saving of material but also in strengthening and lightening the pulley block. The pin forming the chain wheel constitutes one bearing pin or journal for the driving wheel, and the bearing for the cylindrical chain wheel pin constitutes the bearing for this driving wheel journal.

The invention permits the arrangement of the chain wheel and its bearing either between the supporting walls of the pulley block housing, i. e. within the walls of the housing enclosing the gear, or on the outside of the housing enclosing the gear. In the last-mentioned case, the lower block of the pulley block can not only be drawn against the upper block of the pulley block, but also past the latter until it is against the bearing of the chain wheel. In this way, for example in the case of screw pulley blocks, the distance between the upper block and the lower block is reduced by an amount corresponding to the size of the radius of the worm wheel (driving wheel). In addition, the distance between the lateral housing plates is reduced by the width of the chain wheel and, at the same time, there is also a corresponding reduction in the length of the suspension bar between the plates and of the pivot bearing, which means a further saving of material. With the usual chain pulley blocks, the unloaded strand of the load chain can become jammed, in particular in the inclined position of the block, between the worm wheel and the worm which is the driving gear of the chain pulley block, but this danger is avoided by the arrangement of the chain wheel and the mounting thereof on the outside of the housing.

The drawings illustrate an embodiment of the invention by way of example.

Figure 1 is a sectional elevation of the part of a chain pulley block essential for the invention.

Figure 2 shows a side view of the mounting of the chain wheel of the chain pulley block shown in Figure 1, and also shows the lower pulley block.

Referring to the drawings, 1 is the toothed driving wheel which is combined with a cylindrical pin 2, which has circumferential pockets 3 for the links of the chain 7. These pockets are connected centrally by a groove 4 extending around the pin 2 and reducing its cross-section at this point. The pin 2 is surrounded by a bearing 5, which has two bottom openings 6 in tangential alinement with the pockets 3 each of which serves as a passage for the chain 7. The openings 6 are shaped in cross-section to correspond with the cross-section of the chain. The bearing 5 is located on the outside of the gear housing, which encloses the wheel 1 which in this example is a worm wheel driven by means of a worm rotatably mounted in the housing.

The upper block therefore comprises the housing with the worm and worm wheel gearing and the chain wheel, comprising the pin 2, in its bearing 5.

The lower block is indicated at 8 and may be of any suitable type. In this example, the lower block comprises a housing with the load carrying hook a chain wheel or pulley being rotatably mounted in the housing.

I claim:

1. A chain pulley block comprising a housing, a driving toothed wheel in said housing, a unitary cylindrical pin projecting from and coaxial with said driving wheel, said pin forming one journal of said driving wheel and being of the same diameter throughout its length, a bearing integral with said housing and encircling said pin, three circumferential aligned chain pockets in said pin, two bottom openings in said bearing in alignment with said chain pockets, said bottom openings forming passages for the lifting chain, and a groove in the bearing connecting these openings for the passage of the chain, said bearing contacting said pin along the entire length of the lower supporting portion of its cylindrical surface which lies within said housing.

2. A chain pulley block as defined in claim 1, in which said bearing portion of said housing projects laterally from and is smaller in diameter than the remainder of said housing so that the lower end of said lifting chain may be drawn up to a point as high as the lower portion of said driving wheel.

References Cited in the file of this patent

UNITED STATES PATENTS

| 1,245,623 | Schmick | Nov. 6, 1917 |
| 1,807,466 | Birkenmaier | May 26, 1931 |
| 2,243,361 | Stahl | May 27, 1941 |
| 2,352,457 | Thompson | June 27, 1944 |
| 2,480,303 | Pennell | Aug. 30, 1949 |